US012663581B2

(12) United States Patent
Marquez et al.

(10) Patent No.: US 12,663,581 B2
(45) Date of Patent: Jun. 23, 2026

(54) ANALOG MEMORY FOR PHOTONIC CIRCUITS

(71) Applicant: Milkshake Technology Inc., Menlo Park, CA (US)

(72) Inventors: Bicky A. Marquez, Kingston (CA); Bhavin J. Shastri, Kingston (CA); Douglas H. Wightman, Kingston (CA)

(73) Assignee: Milkshake Technology Inc., Menlo Park, CA (US)

( * ) Notice: Subject to any disclaimer, the term of this patent is extended or adjusted under 35 U.S.C. 154(b) by 378 days.

(21) Appl. No.: 18/155,414

(22) Filed: Jan. 17, 2023

(65) Prior Publication Data

US 2024/0241308 A1 Jul. 18, 2024

(51) Int. Cl.
*G02B 6/12* (2006.01)
*G02F 7/00* (2006.01)

(52) U.S. Cl.
CPC ..... *G02B 6/12007* (2013.01); *G02B 6/12004* (2013.01); *G02F 7/00* (2013.01)

(58) Field of Classification Search
CPC .... G02B 6/12004; G02B 6/12007; G02F 7/00
See application file for complete search history.

(56) References Cited

U.S. PATENT DOCUMENTS

| | | | | |
|---|---|---|---|---|
| 9,020,076 B2 * | 4/2015 | Fujii | .................... | H04L 25/067 |
| | | | | 375/267 |
| 10,740,693 B2 * | 8/2020 | Lazovich | ............... | G06N 3/084 |
| 11,281,972 B2 * | 3/2022 | Shen | ..................... | G06N 3/044 |
| 2019/0370652 A1 | 12/2019 | Shen et al. | | |
| 2022/0179159 A1 | 6/2022 | Wu et al. | | |

OTHER PUBLICATIONS

International Search Report and Written Opinion, Patent Cooperation Treaty Application No. PCT/CA2023/050603, mailing date Sep. 5, 2023, 9 pages.
Howard, E.R., et al., "Photonic Long-Short Term Memory Neural Networks with Analog Memory," 2020 IEEE Photonics Conference (IPC), Vancouver, BC, Canada, 2020, pp. 1-2, doi: 10.1109/IPC47351.2020.9252216.

* cited by examiner

*Primary Examiner* — Ryan A Lepisto
(74) *Attorney, Agent, or Firm* — Fenwick & West LLP

(57) ABSTRACT

Embodiments of the present disclosure are directed to an integrated circuit with a photonic processor and an electrical analog memory. The integrated circuit further includes an array of photonic intensity modulators coupled to the photonic processor via a first set of optical connections, and an array of photodetectors coupled to the photonic processor via a second set of optical connections. The electrical analog memory is directly coupled to the array of photodetectors and the array of photonic intensity modulators.

15 Claims, 9 Drawing Sheets

300

Flip-Flop
400

Next-State
410

State
415

Clk
405

Sequential
Circuit
420

Flip-Flop
400

Next-State
430

State
435

Combinational
Logic
440

Clk
425

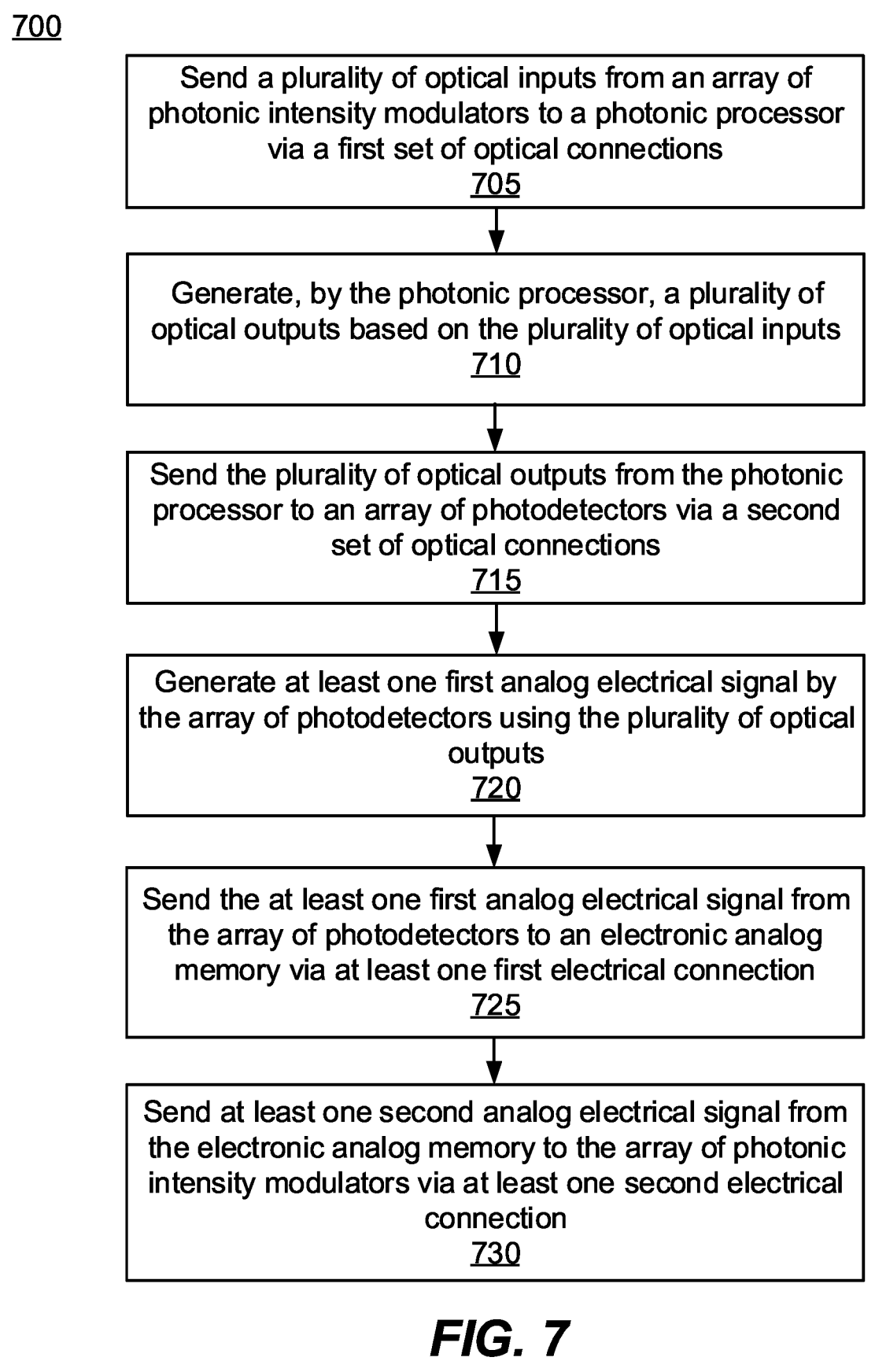

700

Send a plurality of optical inputs from an array of
photonic intensity modulators to a photonic processor
via a first set of optical connections
705

Generate, by the photonic processor, a plurality of
optical outputs based on the plurality of optical inputs
710

Send the plurality of optical outputs from the photonic
processor to an array of photodetectors via a second
set of optical connections
715

Generate at least one first analog electrical signal by
the array of photodetectors using the plurality of optical
outputs
720

Send the at least one first analog electrical signal from
the array of photodetectors to an electronic analog
memory via at least one first electrical connection
725

Send at least one second analog electrical signal from
the electronic analog memory to the array of photonic
intensity modulators via at least one second electrical
connection
730

*FIG. 7*

ANALOG MEMORY FOR PHOTONIC CIRCUITS

TECHNICAL FIELD

The present disclosure generally relates to a processor architecture and, more specifically, to an analog memory for photonic circuits.

BACKGROUND

Photonic hardware is favorable for applications requiring a high bandwidth, low latency, and low level of switching energy for signal processing and data communications. Recent innovations in silicon photonic fabrication have enabled the on-chip implementation of photonic circuits. This has opened a low-cost, high-precision, and scalable avenue for the development of photonic computing. Advances in photonic computing have demonstrated suitability for applications requiring high-bandwidth parallel processing, especially neural networks, offering higher speed and less energy consumption than equivalent networks implemented in digital electronics. However, photonic hardware implemented with a digital memory for holding data during photonic computing suffers an additional latency due to data conversion from analog optical to digital format and vice versa. Similarly, photonic hardware implemented with optical memory devices suffers a lack of reliability and a prohibitively high write time latency of optical memory access.

SUMMARY

Embodiments of the present disclosure are directed to an integrated circuit with a photonic processor and an electrical analog memory. The integrated circuit further includes an array of photonic intensity modulators coupled to the photonic processor via a first set of optical connections and an array of photodetectors coupled to the photonic processor via a second set of optical connections. The electrical analog memory is directly coupled to the array of photodetectors and the array of photonic intensity modulators.

Embodiments of the present disclosure are further directed to a non-transitory computer-readable storage medium comprising stored thereon executable instructions that, when executed by at least one processor, cause at least one processor to: initiate sending a plurality of optical inputs from an array of photonic intensity modulators to a photonic processor via a first set of optical connections; instruct the photonic processor to generate a plurality of optical outputs based on the plurality of optical inputs; initiate sending the plurality of optical outputs from the photonic processor to an array of photodetectors via a second set of optical connections; initiate generating at least one first analog electrical signal by the array of photodetectors using the plurality of optical outputs; initiate sending the at least one first analog electrical signal from the array of photodetectors to an electrical analog memory via at least one first electrical connection; and initiate sending at least one second analog electrical signal from the electrical analog memory to the array of photonic intensity modulators via at least one second electrical connection.

Embodiments of the present disclosure are further directed to a method for operating an electrical analog memory coupled to a photonic processor. The method comprises: sending a plurality of optical inputs from an array of photonic intensity modulators to a photonic processor via a first set of optical connections; generating, by the photonic processor, a plurality of optical outputs based on the plurality of optical inputs; sending the plurality of optical outputs from the photonic processor to an array of photodetectors via a second set of optical connections; generating at least one first analog electrical signal by the array of photodetectors using the plurality of optical outputs; sending the at least one first analog electrical signal from the array of photodetectors to an electrical analog memory via at least one first electrical connection; and sending at least one second analog electrical signal from the electrical analog memory to the array of photonic intensity modulators via at least one second electrical connection.

BRIEF DESCRIPTION OF THE DRAWINGS

FIG. 7 is a flowchart illustrating an example method for operating an electrical analog memory coupled to a photonic processor, in accordance with some embodiments.

The figures depict embodiments of the present disclosure for purposes of illustration only. One skilled in the art will readily recognize from the following description that alternative embodiments of the structures and methods illustrated herein can be employed without departing from the principles or benefits touted by the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that can be employed without departing from the principles of what is claimed.

Reference will now be made in detail to several embodiments, examples of which are illustrated in the accompanying figures. It is noted that wherever practicable similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Embodiments of the present disclosure are directed to an integrated circuit with a photonic processor and an electrical analog memory. The integrated circuit further includes an array of photonic intensity modulators and an array of photodetectors for coupling the photonic processor to the electrical analog memory. The integrated circuit with the photonic processor coupled with the electrical analog memory presented herein achieves improved computational performance (i.e., a lower latency) as inherently analog photonic computing at the photonic processor is matched with a low latency of accessing analog data in the electrical analog memory.

Integrated Circuit With Photonic Processor and Electrical Analog Memory

Figure 1:
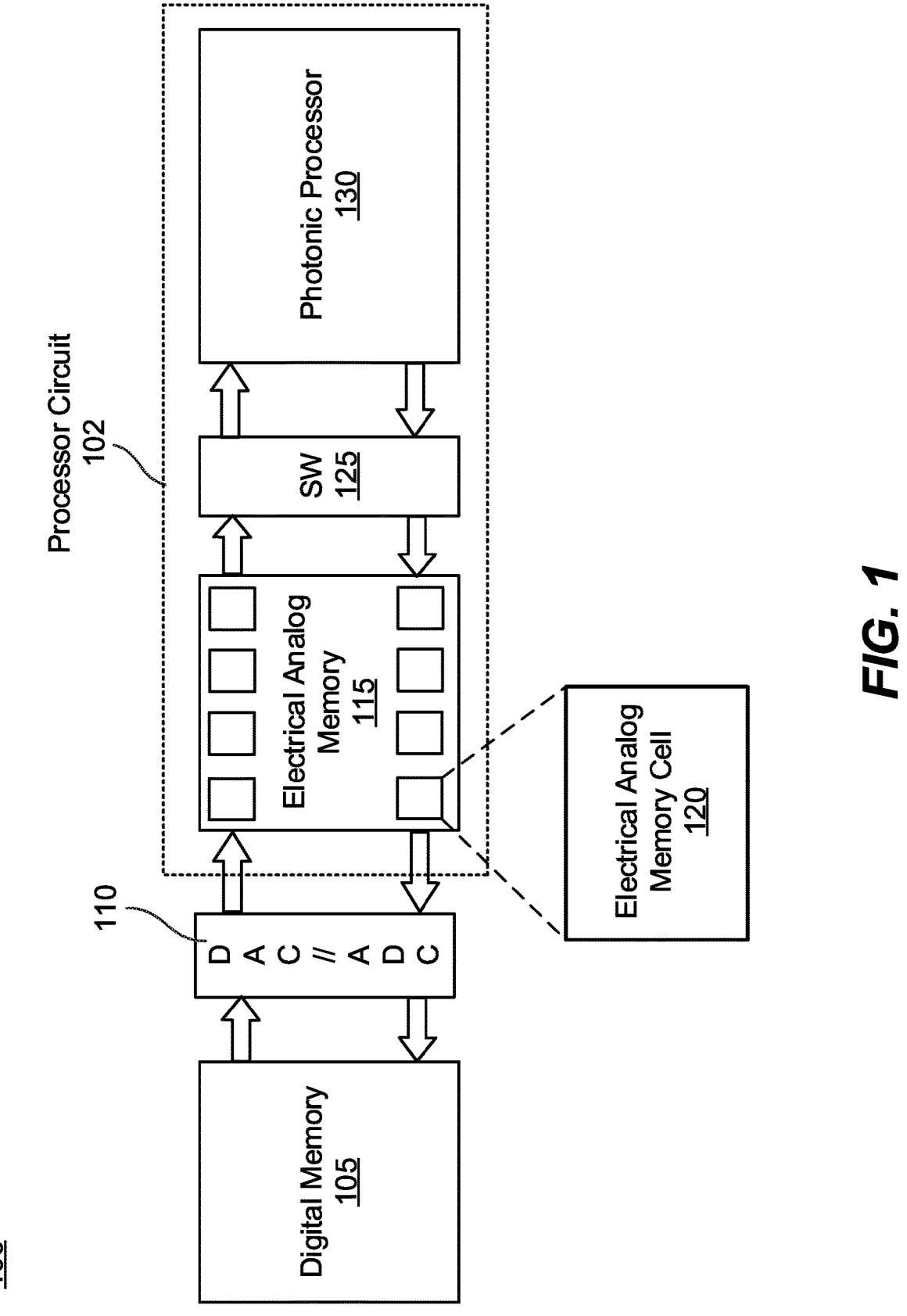
FIG. 1 illustrates an example block diagram of an integrated circuit with a photonic processor coupled to an electrical analog memory, in accordance with some embodiments.

Figure (FIG. 1 illustrates an example block diagram of an integrated circuit 100 with photonic circuits, in accordance with some embodiments. The integrated circuit 100 may include a processor circuit 102, a digital memory 105, and a digital-to-analog converter (DAC)/analog-to-digital converter (ADC) 110. Digital data read from the digital memory 105 may be provided, via the DAC/ADC 110, in an analog electrical format to the processor circuit 102. Also, analog electrical data generated by the processor circuit 102 may be converted back into a digital format via the DAC/ADC 110 and written into the digital memory 105. The integrated circuit 100 may include fewer or additional components not shown in FIG. 1.

To achieve improved computational performance and decrease the latency of the processor circuit 102, an electrical analog memory 115 may be integrated into the processor circuit 102. In such a way, lower-speed access of the digital memory 105 during computational operations at the processor circuit 102 may be avoided and replaced with higher-speed access of the electrical analog memory 115. As shown in FIG. 1, the processor circuit 102 may include the electrical analog memory 115, an array of photonic switches 125, and a photonic processor 130. The processor circuit 102 may include fewer components than shown in FIG. 1 or additional components not shown in FIG. 1.

The electrical analog memory 115 may store intermediate results (e.g., in analog electrical format) generated by the photonic processor 130. The electrical analog memory 115 may comprise an array of electrical analog memory cells 120 for storing analog electrical data. The electrical analog memory 115 may be implemented as an array of volatile electrical analog memory cells 120 and/or an array of non-volatile electrical analog memory cells 120. The photonic processor 130 may directly store intermediate results to the electrical analog memory cells 120 and load the intermediate results directly from the electrical analog memory cells 120 without accessing the digital memory 105, thus providing improved computational performance and decreased latency of the processor circuit 102. The digital memory 105 may only be employed by the processor circuit 102 to load digital input data initially, and to store final digital output data, e.g., for later use by a digital signal processor (not shown in FIG. 1).

The array of photonic switches 125 may convert analog electrical data from the electrical analog memory 115 into optical data for the photonic processor 130. Furthermore, the array of photonic switches 125 may convert optical data from the photonic processor 130 into analog electrical data for storage in the electrical analog memory 115. The array of photonic switches 125 may include an array of photonic intensity modulators and an array of photodetectors. More details about the structure and operation of the array of photonic switches 125 are provided in relation to FIG. 2, FIG. 3A and FIG. 3B.

The photonic processor 130 may execute different operations (i.e., instructions) on data represented as pulses of light (i.e., optical data). The photonic processor 130 may be configured for the execution of various algorithms, e.g., machine learning algorithms, secure hash algorithms, etc. The photonic processor 130 may be implemented on a silicon photonics platform. The photonic processor 130 may include photonic components (e.g., photonic crystals or inverse-designed structures), optical interconnects, active photonic components (e.g., modulators, photodetectors), passive photonic components (e.g., couplers, resonators, logic gates), three-dimensional waveguides (e.g., designed on silicon-based dual layer wafers or silicon-nitride-based dual layer wafers), some other photonic components, or some combination thereof. The photonic processor 130 may utilize wavelength-division multiplexing, time-division multiplexing, mode-division multiplexing, some other multiplexing technique, or some combination thereof.

The photonic processor 130 may perform photonic computing that is inherently analog. This makes the photonic processor 130 suitable for direct coupling with the electrical analog memory 115. The photonic processor 130 may execute a plurality of instructions at a latency determined based on at least one of a first write-in speed to the electrical analog memory 115 and a second read-out speed from the electrical analog memory 115. The photonic processor 130 may have a total computational time dependent upon at least one of a write-in time of the electrical analog memory 115 and a read-out time of the electrical analog memory 115. More details about the structures and operations of processor circuit 102 with the electrical analog memory 115 coupled to the photonic processor 130 are provided in relation to FIG. 2, FIG. 3A and FIG. 3B.

Figure 2:
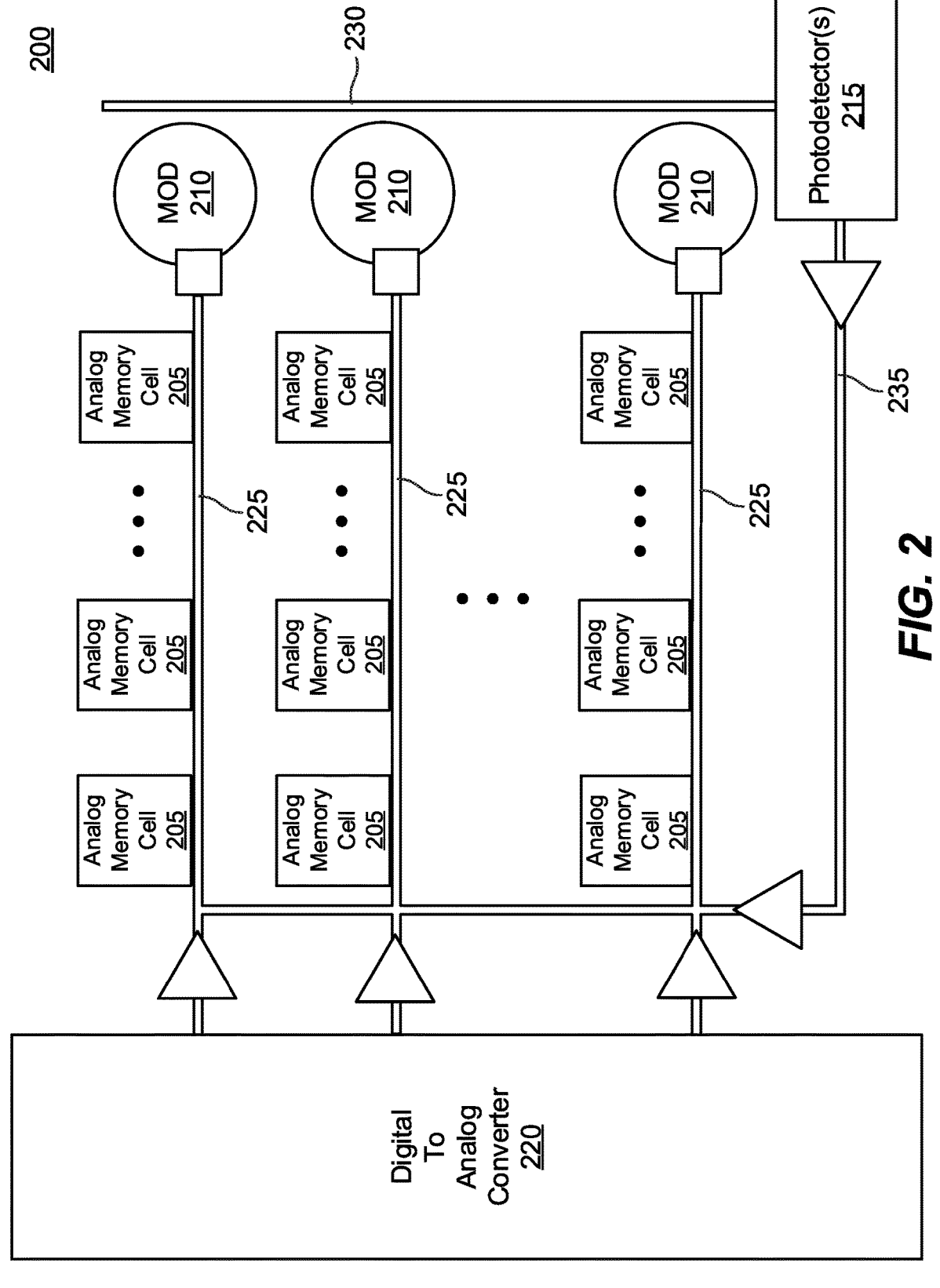
FIG. 2 illustrates an example block diagram of an array of electrical analog memory cells coupled to an array of photonic intensity modulators, in accordance with some embodiments.

FIG. 2 illustrates an example block diagram 200 of an array of electrical analog memory cells 205 coupled to an array of photonic intensity modulators 210 and at least one photodetector 215, in accordance with some embodiments. Each electrical analog memory cell 205 may be an embodiment of the electrical analog memory cell 120 of the electrical analog memory 115. The array of photonic intensity modulators 210 and the at least one photodetector 215 may be part of the array of photonic switches 125. The array of photonic intensity modulators 210 and the at least one photodetector 215 may couple the array of electrical analog memory cells 205 to a photonic processor (not shown in FIG. 2). In some embodiments, as shown in FIG. 2, a DAC 220 may be connected to the array of electrical analog memory cells 205 and the array of photonic intensity modulators 210.

The array of photonic intensity modulators 210 may receive analog electrical signals from the array of electrical analog memory cells 205 and generate optical signals based on the received analog electrical signals. The array of photonic intensity modulators 210 may transmit the generated optical signals to the photonic processor, e.g., via a set of optical connections (not shown in FIG. 2). The array of photonic intensity modulators 210 may be implemented as, e.g., an array of electro-optic effect modulators, an array of carrier-depletion effect modulators, and/or an array of thermo-optic effect modulators.

The array of electrical analog memory cells 205 may be organized as a two-dimensional array of analog memory cells. Each row of electrical analog memory cells 205 in the array of electrical analog memory cells 205 may be directly connected to a respective photonic intensity modulator 210 via a respective electrical connection 225 of a plurality of electrical connections 225. Furthermore, the respective photonic intensity modulator 210 may be directly connected to a respective output of the DAC 220 via the respective electrical connection 225. The array of photonic intensity modulators 210 may receive analog electrical data (e.g., initial input data) directly from the DAC 220 via the plurality of electrical connections 225 and generate optical data for the photonic processor based on the analog electrical data received from the DAC 220. Alternatively, or additionally, at least a portion of the analog electrical data from the DAC 220 may be stored in the array of electrical analog memory cells 205 before being offloaded to the photonic processor (e.g., after conversion into optical data via the array of photonic intensity modulators 210).

The at least one photodetector 215 may receive at least one optical signal from the photonic processor, e.g., via an optical connection 230, and generate at least one analog electrical signal based on the received at least one optical signal. The at least one photodetector 215 may directly input the at least one analog electrical signal into at least one electrical analog memory cell 205, e.g., via an electrical connection 235. Alternatively (not shown in FIG. 2), the at least one photodetector 215 may include an array of photodetectors, and each photodetector in the array may be connected to a corresponding row of electrical analog memory cells 205 via a corresponding electrical connection. In such case, each photodetector in the array may provide analog electrical data into at least one electrical analog memory cell 205 of the corresponding row of electrical analog memory cells 205.

Figure 3A:
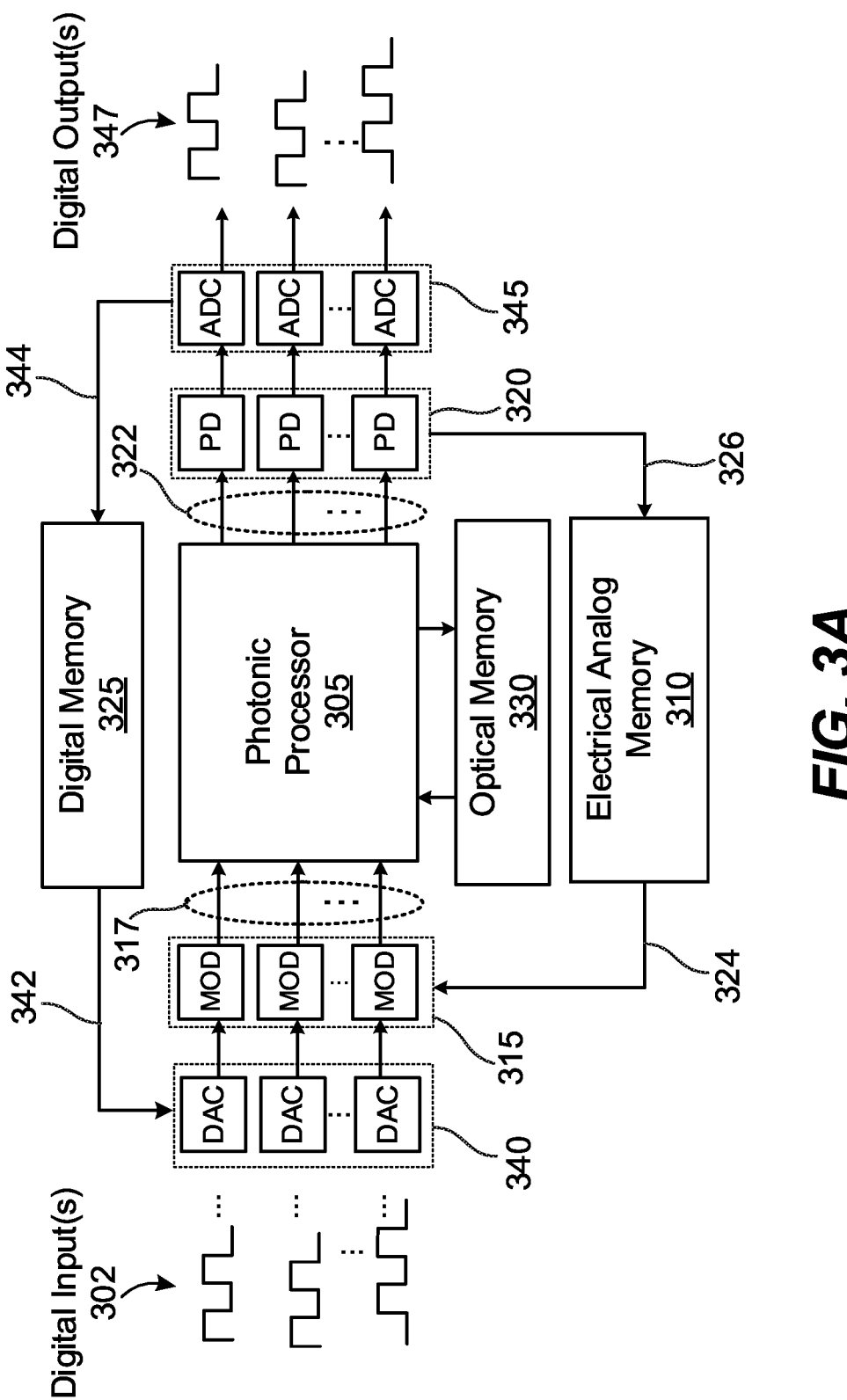
FIG. 3A illustrates an example block diagram of an integrated circuit with a photonic processor coupled to an electrical analog memory, in accordance with some embodiments.

FIG. 3A illustrates an example block diagram of an integrated circuit 300 with a photonic processor 305 and an electrical analog memory 310, in accordance with some embodiments. The integrated circuit 300 further includes an array of photonic intensity modulators 315 and an array of photodetectors 320. The integrated circuit 300 may optionally include a digital memory 325, an optical memory 330, an array of DACs 340, and an array of ADCs 345. The integrated circuit 300 may be an embodiment of the integrated circuit 100. The integrated circuit 300 may include fewer components than shown in FIG. 3A or additional components not shown in FIG. 3A.

The photonic processor 305 may execute different operations (i.e., instructions) on optical data received from the array of photonic intensity modulators 315 and may output optical data for the array of photodetectors 320. The photonic processor 305 may be configured for the execution of various algorithms, e.g., machine learning algorithms, secure hash algorithms, etc. The photonic processor 305 may be implemented on a silicon photonics platform. The photonic processor 305 may include photonic components (e.g., photonic crystals or inverse-designed structures), optical interconnects, active photonic components (e.g., modulators, photodetectors), passive photonic components (e.g., couplers, resonators, logic gates), three-dimensional waveguides (e.g., designed on silicon-based dual layer wafers or silicon-nitride-based dual layer wafers), some other photonic components, or some combination thereof. The photonic processor 305 may utilize wavelength-division multiplexing, time-division multiplexing, mode-division multiplexing, some other multiplexing technique, or some combination thereof. The photonic processor 305 may be an embodiment of the photonic processor 130.

The photonic processor 305 may perform photonic computing that is inherently analog. This makes the photonic processor 305 suitable for operating efficiently when being coupled to the electrical analog memory 310. The photonic processor 305 may execute a plurality of instructions at a latency determined based on at least one of a first write-in speed to the electrical analog memory 310 and a second read-out speed from the electrical analog memory 310. The photonic processor 305 may have a total computational time dependent upon at least one of a write-in time of the electrical analog memory 310 and a read-out time of the electrical analog memory 310.

The electrical analog memory 310 may store data (e.g., in analog electrical format) generated by the photonic processor 305 that would be later utilized again by the photonic processor 305, thus improving the computational performance of the integrated circuit 300. The electrical analog memory 310 may be directly coupled to the array of photodetectors 320 and the array of photonic intensity modulators 315. At least one output port of the electrical analog memory 310 may be connected to at least one input of the array of photonic intensity modulators 315 via at least one electrical connection 324. Thus, data loaded from the electrical analog memory 310 may be directly provided to the array of photonic intensity modulators 315 via the at least one electrical connection 324. At least one output of the array of photodetectors 320 may be coupled to at least one input port of the electrical analog memory 310 via at least one electrical connection 326. Thus, data generated by the photonic processor 305 and converted from the optical format into the electrical format via the array of photodetectors 320 may be directly written into the electrical analog memory 310 via the at least one electrical connection 326 and at least one input port of the electrical analog memory 310.

The electrical analog memory 310 may act as part of a cache hierarchy, with the electrical analog memory 310 being an "interface" between optical components (e.g., the photonic processor 305 and the array of photonic intensity modulators 315) and complementary metal-oxide semiconductor (CMOS) components (e.g., the array of photodetectors 320, and the digital memory 325). The electrical analog memory 310 may also link the photonic processor 305 into the larger memory hierarchy (e.g., with, optionally, L1, L2, L3 caches, and CMOS RAM, such as the digital memory 325).

The electrical analog memory 310 may be implemented as a volatile electrical analog memory (e.g., analog random-access memory (RAM)) and/or a non-volatile electrical analog memory (e.g., analog non-volatile random-access memory (NVRAM)). The electrical analog memory 310 may include an array of electrical analog memory cells organized into at least one memory bank. A subset of the electrical analog memory cells in the electrical analog memory 310 may be coupled to a corresponding photonic intensity modulator in the array of photonic intensity modulators 315 via the at least one electrical connection 324. Similarly, a corresponding photodetector in the array of photodetectors 320 may be coupled to the subset of electrical analog memory cells in the electrical analog memory 310 via the at least one electrical connection 326. The electrical analog memory 310 may be an embodiment of the electrical analog memory 115.

The array of photonic intensity modulators 315 may generate at least one optical signal for the photonic processor 305 based on at least one analog electrical signal received from the electrical analog memory 310 via a first set of electrical connections (e.g., at least one electrical connection 324). The array of photonic intensity modulators 315 may further generate optical signal(s) for the photonic processor 305 based on analog electrical signal(s) received from the array of DACs 340. Alternatively, the array of photonic intensity modulators 315 may generate optical signal(s) for the photonic processor 305 directly based on digital input(s) 302. The array of photonic intensity modulators 315 may be coupled to the photonic processor 305 via a set of optical connections 317. The array of photonic intensity modulators 315 may be an embodiment of the array of photonic intensity modulators 210.

The array of photodetectors 320 may generate at least one analog electrical signal using at least one optical signal generated by the photonic processor 305 and received from the photonic processor 305 via a set of optical connections 322. The array of photodetectors 320 may send the at least one analog electrical signal to the electrical analog memory 310 via a second set of electrical connections (e.g., at least one electrical connection 326). Furthermore, the array of photodetectors 320 may send analog electrical signal(s) to the array of ADCs 345 for generating digital output(s) 347. Alternatively, the array of photodetectors 320 may directly generate the digital output(s) 347 based on optical signal(s) from the photonic processor 305. The array of photodetectors 320 may be an embodiment of the at least one photodetector 215.

In some embodiments, the array of DACs 340 is coupled to the array of photonic intensity modulators 315 via a set of electrical connections. The array of DACs 340 may receive the digital input(s) 302 (e.g., obtained from a digital signal processor, not shown in FIG. 3A) and generate at least one analog electrical input for the array of photonic intensity modulators 315. Alternatively, or additionally, the array of DACs 340 may receive digital data from the digital memory 325 via at least one digital electrical connection 342. In one or more embodiments, the array of DACs 340 is bypassed, and one or more digital inputs 302 may be directly provided to the array of photonic intensity modulators 315 that generates at least one optical signal for the photonic processor 305 based on the digital input(s) 302.

In some embodiments, the array of ADCs 345 is coupled to the array of photodetectors 320 via a set of electrical connections. The array of ADCs 345 may receive at least one digital electrical signal from the array of photodetectors 320 and generate the digital output(s) 347. The digital output(s) 347 may be provided to, e.g., a digital signal processor (not shown in FIG. 3A). Alternatively, or additionally, the array of ADCs 345 may provide digital data to the digital memory 325 via at least one digital electrical connection 344.

In some embodiments, the digital memory 325 is coupled between the array of ADCs 345 and the array of DACs 340. The digital memory 325 may store data in digital format that was generated in optical format by the photonic processor 305. The digital memory 325 may provide the stored digital data to the array of DACs 340 for use by the photonic processor 305. At least one input port of the digital memory 325 may be coupled to the array of ADCs 345 via the at least one digital electrical connection 344. Also, at least one output port of the digital memory 325 may be coupled to the array of DACs 340 via the at least one digital electrical connection 342. The digital memory 325 may include at least one memory bank of, e.g., a dynamic random access memory (DRAM), or some other type of non-transitory storage medium capable of storing digital electrical data. The digital memory 325 may be an embodiment of the digital memory 105.

In some embodiments, the optical memory 330 may be directly coupled to the photonic processor 305, e.g., via a set of optical connections. The optical memory 330 may receive and store optical data generated by the photonic processor 305. The photonic processor 305 may also load optical data from the optical memory 330. It should be noted that the latency of the optical memory 330 is substantially higher than the latency of the electrical analog memory 310 (including additional latencies of the array of photonic intensity modulators 315 and the array of photodetectors 320). The optical memory 330 may be implemented as, e.g., an optical RAM, an optical NVRAM, or some other type of non-transitory storage medium capable of storing optical data.

Figure 3B:
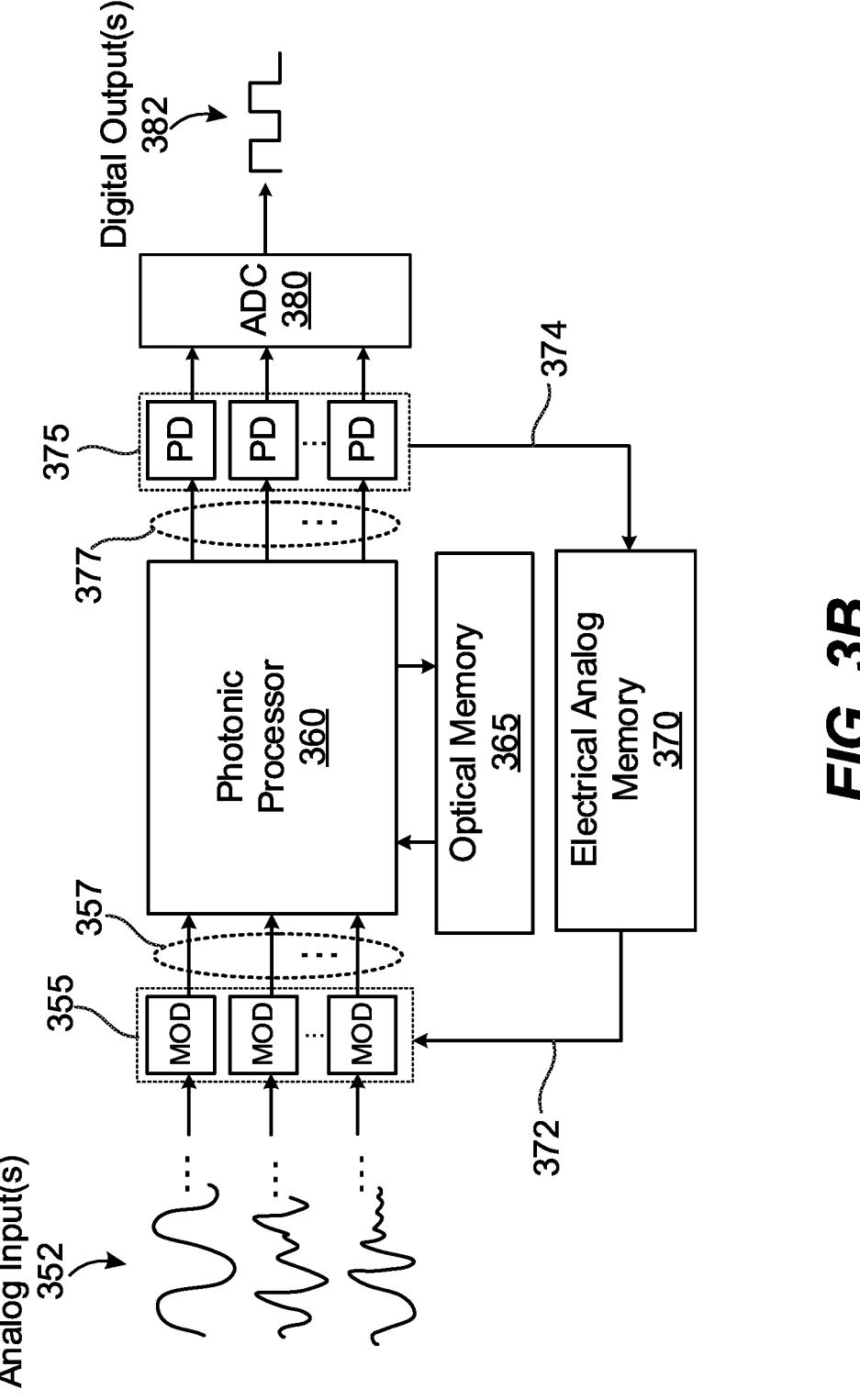
FIG. 3B illustrates another example block diagram of an integrated circuit with a photonic processor coupled to an electrical analog memory, in accordance with some embodiments.

FIG. 3B illustrates an example block diagram of an integrated circuit 350 with a photonic processor 360 and an electrical analog memory 370, in accordance with some embodiments. The integrated circuit 350 further includes an array of photonic intensity modulators 355 and an array of photodetectors 375. The integrated circuit 300 may optionally include an optical memory 365 and at least one ADC 380. The integrated circuit 350 may be an embodiment of the integrated circuit 100. The integrated circuit 350 may include fewer components than shown in FIG. 3B or additional components not shown in FIG. 3B.

The photonic processor 360 may execute different operations (i.e., instructions) on optical data received from the array of photonic intensity modulators 355 and may output optical data for the array of photodetectors 375. The photonic processor 360 may be configured for the execution of various algorithms, e.g., machine learning algorithms, secure hash algorithms, etc. The photonic processor 360 may be implemented on a silicon photonics platform. The photonic processor 360 may include photonic components (e.g., photonic crystals or inverse-designed structures), optical interconnects, active photonic components (e.g., modulators, photodetectors), passive photonic components (e.g., couplers, resonators, logic gates), three-dimensional waveguides (e.g., designed on silicon-based dual layer wafers or silicon-nitride-based dual layer wafers), some other photonic components, or some combination thereof. The photonic processor 360 may utilize wavelength-division multiplexing, time-division multiplexing, mode-division multiplexing, some other multiplexing technique, or some combination thereof. The photonic processor 360 may be an embodiment of the photonic processor 130.

The photonic processor 360 may perform photonic computing that is inherently analog. This makes the photonic processor 360 suitable for operating efficiently when directly coupled to the electrical analog memory 370. The photonic processor 360 may execute a plurality of instructions at a latency determined based on at least one of a first write-in speed to the electrical analog memory 370 and a second read-out speed from the electrical analog memory 370. The photonic processor 360 may have a total computational time dependent upon at least one of a write-in time of the electrical analog memory 370 and a read-out time of the electrical analog memory 370.

The electrical analog memory 370 may store data (e.g., in analog electrical format) generated by the photonic processor 360 that would be later utilized again by the photonic processor 360, thus improving the computational performance of the integrated circuit 350. The electrical analog memory 370 may be directly coupled to the array of photodetectors 375 and the array of photonic intensity modulators 355. At least one output port of the electrical analog memory 370 may be connected to at least one input of the array of photonic intensity modulators 355 via at least one electrical connection 372. Thus, data loaded from the electrical analog memory 370 may be directly provided to the array of photonic intensity modulators 355 via the at least one electrical connection 372. At least one output of the array of photodetectors 375 may be coupled to at least one input port of the electrical analog memory 370 via at least one electrical connection 374. Thus, data generated by the photonic processor 360 and converted from the optical format into the electrical format via the array of photodetectors 375 may be directly written into the electrical analog memory 370 via the at least one electrical connection 374 and at least one input port of the electrical analog memory 370.

The electrical analog memory 370 may act as part of a cache hierarchy, with the electrical analog memory 370 being an "interface" between optical components (e.g., the photonic processor 360 and the array of photonic intensity modulators 355) and CMOS components (e.g., the array of photodetectors 375). The electrical analog memory 370 may also link the photonic processor 360 into the larger memory hierarchy (e.g., with, optionally, L1, L2, L3 caches, and CMOS RAM).

The electrical analog memory 370 may be implemented as a volatile electrical analog memory (e.g., analog RAM) and/or a non-volatile electrical analog memory (e.g., analog NVRAM). The electrical analog memory 370 may include an array of electrical analog memory cells organized into at least one memory bank. A subset of the electrical analog memory cells in the electrical analog memory 370 may be coupled to a corresponding photonic intensity modulator in the array of photonic intensity modulators 355 via the at least one electrical connection 372. Similarly, a corresponding photodetector in the array of photodetectors 375 may be coupled to the subset of electrical analog memory cells in the electrical analog memory 370 via the at least one electrical connection 374. The electrical analog memory 370 may be an embodiment of the electrical analog memory 115.

The array of photonic intensity modulators 355 may generate one or more optical signals for the photonic processor 360 based on one or more analog electrical inputs 352. The array of photonic intensity modulators 355 may further generate at least one optical signal for the photonic processor 360 based on at least one analog electrical signal received from the electrical analog memory 370 via at least one electrical connection 372. The array of photonic intensity modulators 355 may be coupled to the photonic processor 360 via a set of optical connections 357. The array of photonic intensity modulators 355 may be an embodiment of the array of photonic intensity modulators 210.

The array of photodetectors 375 may generate at least one analog electrical signal using at least one optical signal generated by the photonic processor 360 and received from the photonic processor 360 via a set of optical connections 377. The array of photodetectors 375 may send the at least one analog electrical signal to the electrical analog memory 370 via the at least one electrical connection 374. Furthermore, the array of photodetectors 375 may send one or more analog electrical signals to the at least one ADC 380 for generating one or more digital outputs 382. The array of photodetectors 375 may be an embodiment of the at least one photodetector 215.

The at least one ADC 380 may be coupled to the array of photodetectors 375 via a set of electrical connections. The at least one ADC 380 may receive at least one digital electrical signal from the array of photodetectors 375 and generate the one or more digital outputs 382 based on the at least one received digital electrical signal. The one or more digital outputs 382 may be passed onto, e.g., a digital signal processor (not shown in FIG. 3B).

The optical memory 365 may be directly coupled to the photonic processor 360, e.g., via a set of optical connections. The optical memory 365 may receive and store optical data generated by the photonic processor 360. The photonic processor 360 may also load optical data from the optical memory 365. It should be noted that the latency of the optical memory 365 is substantially higher than the latency of the electrical analog memory 370 (including additional latencies of the array of photonic intensity modulators 355 and the array of photodetectors 375). The optical memory 365 may be implemented as, e.g., an optical RAM, an optical NVRAM, or some other type of non-transitory storage medium capable of storing optical data.

A photonic processor with an electrical analog memory may be utilized to generate photonic circuits having various functionalities. Examples of photonic circuits with electrical analog memory are described in relation to FIG. 4C, FIG. 5, and FIG. 6.

Examples of Photonic Circuits With Electrical Analog Memory

Figure 4A:
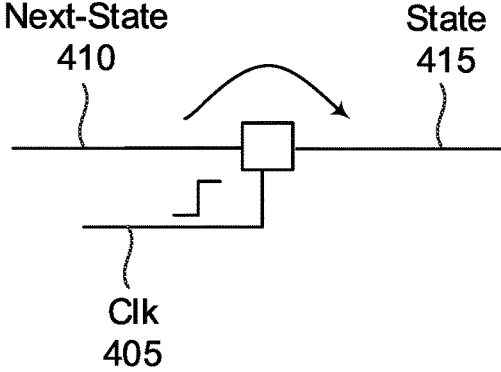
FIG. 4A illustrates an example block diagram of an electrical flip-flop, in accordance with some embodiments.

FIG. 4A illustrates an example block diagram of an electrical flip-flop 400, in accordance with some embodiments. A bit signal next-state 410 may be provided as an input into the electrical flip-flop 400, along with a clock signal 405. The electrical flip-flop 400 may update a bit signal state 415 based on the bit signal next-state 410 in response to a change of the clock signal 405 (e.g., a rising edge of the clock signal 405). For example, when the electrical flip-flop 400 is implemented as a D-type flip-flop, the state 415 is updated to the next-state 410. The state 415 may hold until the next change (e.g., a next rising edge) of the clock signal 405 occurs. It can be observed that all signals in the electrical flip-flop 400 are digital electrical signals (e.g., non-optical digital signals).

A set of N electrical flip-flops 400 implemented as D-type flip-flops may represent N-bit registers utilized as shift registers. Shift registers are sequential circuits that are fundamental parts of computers as the shift registers can be used to store data (e.g., before a binary operation needs to be performed) or to move data inside computers (e.g., after a binary operation is performed). The shift registers can also be used as converters to convert data from parallel to serial or vice-versa. Thus, shift registers and sequential circuits in general implemented with fast flip-flops (e.g., with photonic circuits) can enable faster data conversion and provide direct access to optical logic operations for fast throughput. Details about the implementation of a photonic flip-flop and its usage in sequential photonic circuits are provided in relation to FIG. 4C and FIG. 5.

Figure 4B:
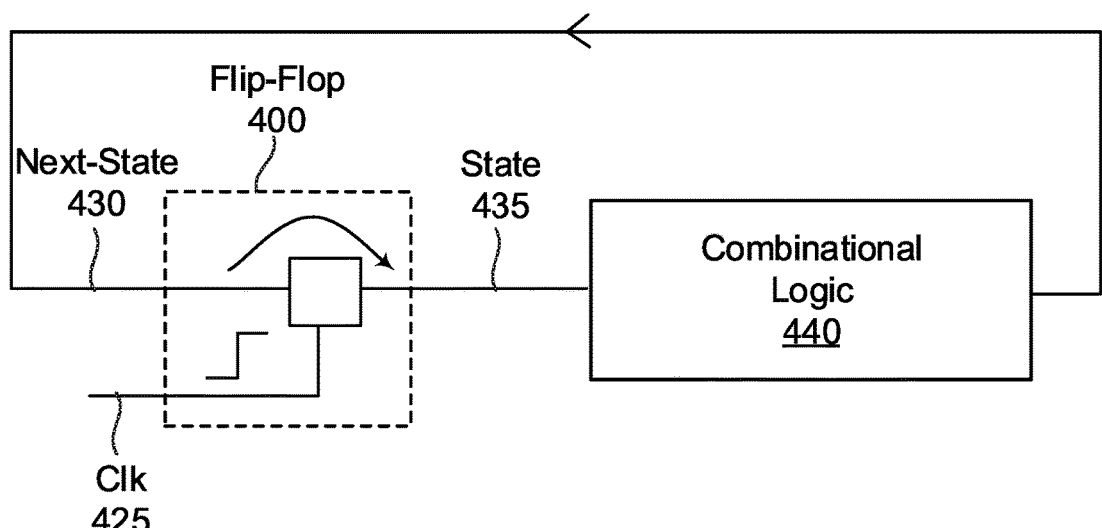
FIG. 4B illustrates an example block diagram of an electrical sequential circuit, in accordance with some embodiments.

FIG. 4B illustrates an example block diagram of an electrical sequential circuit 420, in accordance with some embodiments. The electrical sequential circuit 420 may include the electrical flip-flop 400 and an electrical combinational logic 440. An output state 435 of the electrical flip-flop 400 may be updated (e.g., to a next-state 430) in response to a change of a clock signal 425 (e.g., a rising edge of the clock signal 425). The output state 435 may be input into the electrical combinational logic 440, and the electrical combinational logic 440 may generate an updated value of the next-state 430. Upon a next change of the clock signal 425 (e.g., a next rising edge of the clock signal 425), the output state 435 may be changed to the updated value of the next-state 430. In this manner, the electrical sequential circuit 420 may operate as digital sequential logic. It should be noted that all signals in the electrical sequential circuit 420 are digital electrical signals (e.g., non-optical digital signals). As aforementioned, sequential circuits implemented with photonic circuits can enable faster logic operations for faster throughput. Details about the implementation of different sequential photonic circuits are provided in relation to FIG. 4C, FIG. 5 and FIG. 6.

Figure 4C:
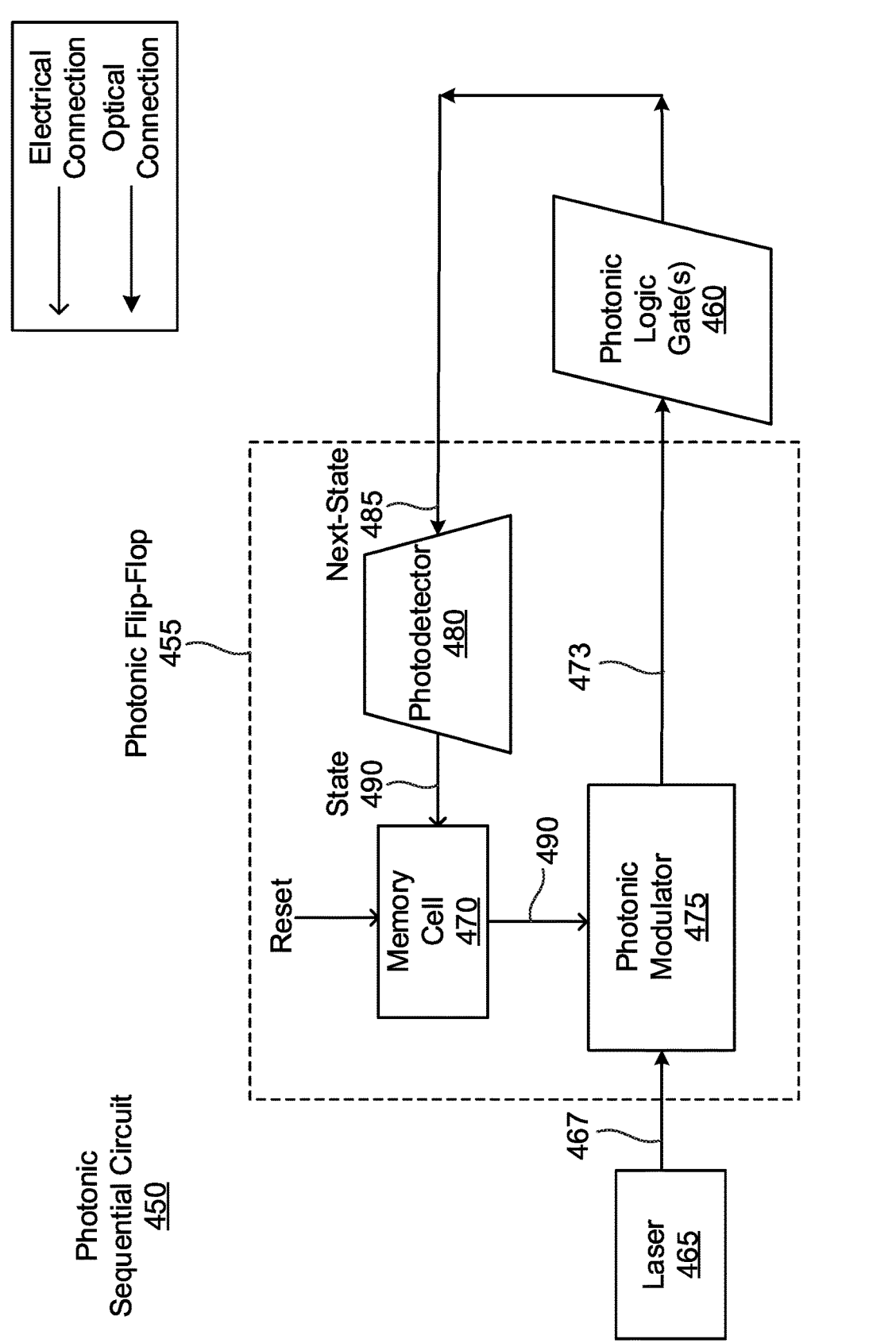
FIG. 4C illustrates an example block diagram of a photonic sequential circuit, in accordance with some embodiments.

FIG. 4C illustrates an example block diagram of a photonic sequential circuit 450, in accordance with some embodiments. The photonic sequential circuit 450 may include a photonic flip-flop 455 and at least one photonic (e.g., passive) logic gate 460. The photonic sequential circuit 450 may further include a laser circuit 465 for providing an initial optical input signal 467 into the photonic flip-flop 455. In comparison with the electrical sequential circuit 420, the electrical flip-flop 400 is replaced with the photonic flip-flop 455, and the electrical combinational logic 440 is replaced with the at least one photonic logic gate 460. The photonic flip-flop 455 may include an electrical analog memory cell 470, a photonic intensity modulator 475, and a photodetector 480. The electrical analog memory cell 470 may be an embodiment of the electrical analog memory cell 120, an embodiment of the electrical analog memory cell 205, an embodiment of an electrical analog memory cell of the electrical analog memory 310, or an embodiment of an electrical analog memory cell of the electrical analog memory 370. The photonic intensity modulator 475 may be an embodiment of the photonic intensity modulator 210, an embodiment of a photonic intensity modulator in the array of photonic intensity modulators 315, or an embodiment of a photonic intensity modulator in the array of photonic intensity modulators 355. The photodetector 480 may be an embodiment of the photodetector 215, an embodiment of a photodetector in the array of photodetectors 320, or an embodiment of a photodetector in the array of photodetectors 375. The at least one photonic logic gate 460 may be an embodiment (or part) of the photonic processor 130, an embodiment (or part) of the photonic processor 305, or an embodiment (or part) of the photonic processor 360.

The photonic intensity modulator 475 may receive the initial optical input signal 467 from the laser circuit 465 and provide the initial optical input signal 467 as an optical signal 473 into the at least one photonic logic gate 460. The at least one photonic logic gate 460 may generate an optical next-state signal 485 based at least in part on the optical signal 473. The optical next-state signal 485 may be input into the photodetector 480. The photodetector 480 may generate an electrical state signal 490 based on the optical next-state signal 485, and the electrical state signal 490 may be stored in the electrical analog memory cell 470. In some embodiments, before providing the initial optical input signal 467 to the photonic flip-flop 455, the electrical analog memory cell 470 is reset. The electrical state signal 490 may be loaded from the electrical analog memory cell 470 into the photonic intensity modulator 475. The photonic intensity modulator 475 may update the optical signal 473 based on the electrical state signal 490 from the electrical analog memory cell 470. The updated optical signal 473 may be then input into the at least one photonic logic gate 460, and the process of updating the optical next-state signal 485 and the optical state signal 490 may be repeated.

Figure 5:
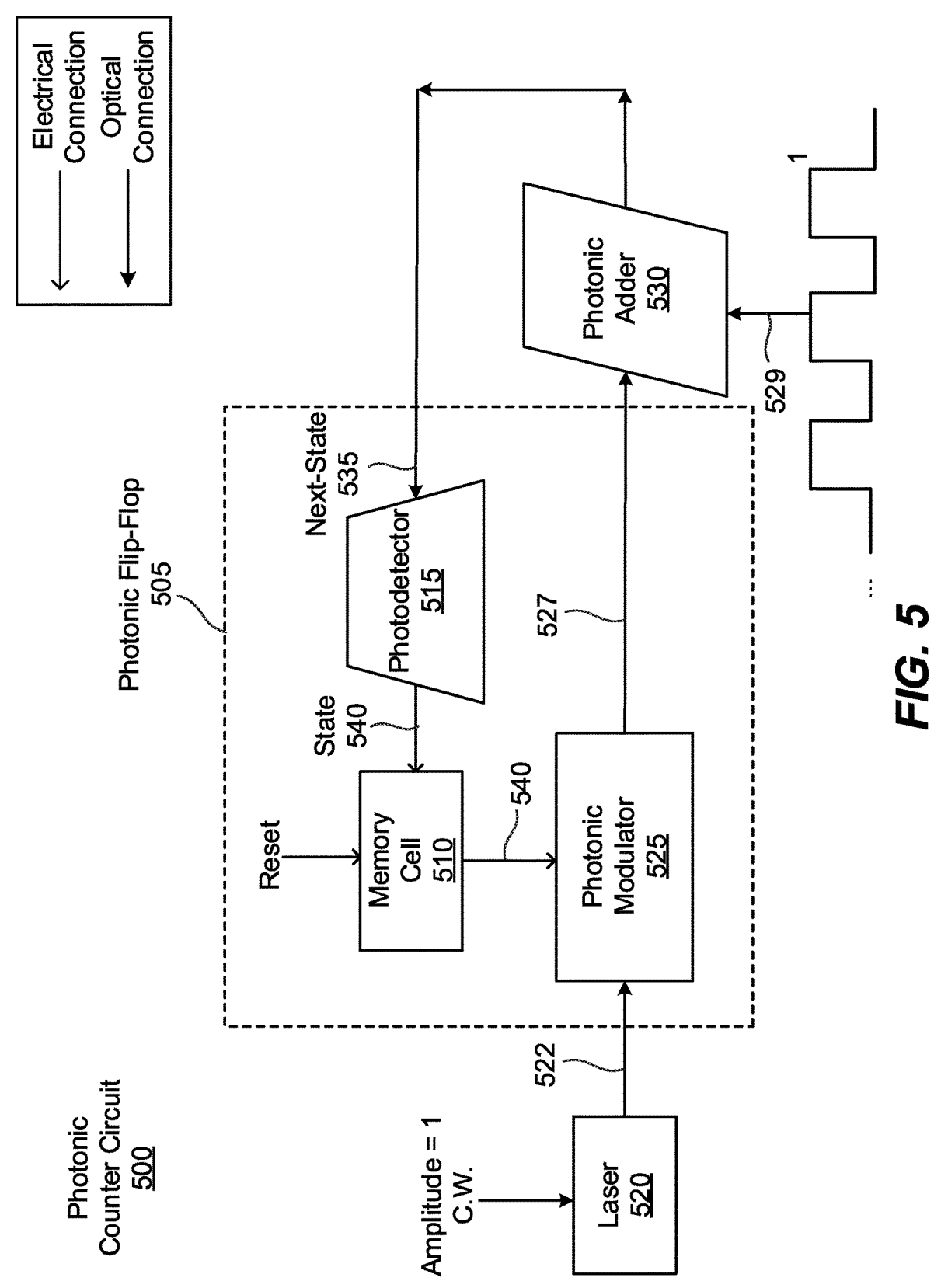
FIG. 5 illustrates an example block diagram of a photonic counter circuit, in accordance with some embodiments.

FIG. 5 illustrates an example block diagram of a photonic counter circuit 500, in accordance with some embodiments. The photonic counter circuit 500 may include a photonic flip-flop 505 and a photonic adder 530 (e.g., full adder). The photonic counter circuit 500 may be an embodiment of the photonic sequential circuit 450, the photonic flip-flop 505 may be an embodiment of the photonic flip-flop 455, and the photonic adder 530 may be an embodiment of the at least one photonic logic gate 460. The photonic counter circuit 500 may further include a laser circuit 520 (e.g., continuous-wave (CW) light source) for providing an initial optical input signal 522 into the photonic flip-flop 505. The initial optical input signal 522 may be, e.g., a CW light signal with an amplitude of 1 (or logic high).

The photonic flip-flop 505 may include an electrical analog memory cell 510, a photonic intensity modulator 525, and a photodetector 515. The electrical analog memory cell 510 may be an embodiment of the electrical analog memory cell 120, an embodiment of the electrical analog memory cell 205, an embodiment of an electrical analog memory cell of the electrical analog memory 310, or an embodiment of an electrical analog memory cell of the electrical analog memory 370. The photonic intensity modulator 525 may be an embodiment of the photonic intensity modulator 210, an embodiment of a photonic intensity modulator in the array of photonic intensity modulators 315, or an embodiment of a photonic intensity modulator in the array of photonic intensity modulators 355. The photodetector 515 may be an embodiment of the photodetector 215, an embodiment of a photodetector in the array of photodetectors 320, or an embodiment of a photodetector in the array of photodetectors 375. The photonic adder 530 may be an embodiment (or part) of the photonic processor 130, an embodiment (or part) of the photonic processor 305, or an embodiment (or part) of the photonic processor 360.

The photonic intensity modulator 525 may receive the initial optical input signal 522 from the laser circuit 520. The initial optical input signal 522 may be passed as an optical signal 527 into a first input of the photonic adder 530. An optical signal 529 (e.g., optical "1" signal) may be passed into a second input of the photonic adder 530. The photonic adder 530 may generate an optical next-state signal 535 by adding the optical signal 527 and the optical signal 529. Thus, the optical next-state signal 535 may be incremented relative to the optical signal 527. The optical next-state signal 535 may be input into the photodetector 515. The photodetector 515 may generate an electrical state signal 540 based on the optical next-state signal 535, and the electrical state signal 540 may be stored in the electrical analog memory cell 510. In some embodiments, before providing the initial optical input signal 522 to the photonic flip-flop 505, the electrical analog memory cell 510 is reset. The electrical state signal 540 may be loaded from the electrical analog memory cell 510 into the photonic intensity modulator 525. The photonic intensity modulator 525 may update the optical signal 527 based on the electrical state signal 540 from the electrical analog memory cell 510. The updated optical signal 527 may be then incremented at the photonic adder 530 to generate the optical next-state signal 535, and the process of updating the optical state signal 540 may be repeated. Thus, the photonic flip-flop with the electrical analog memory cell 510 coupled to the photonic adder 530 may operate as a photonic counter circuit.

Figure 6:
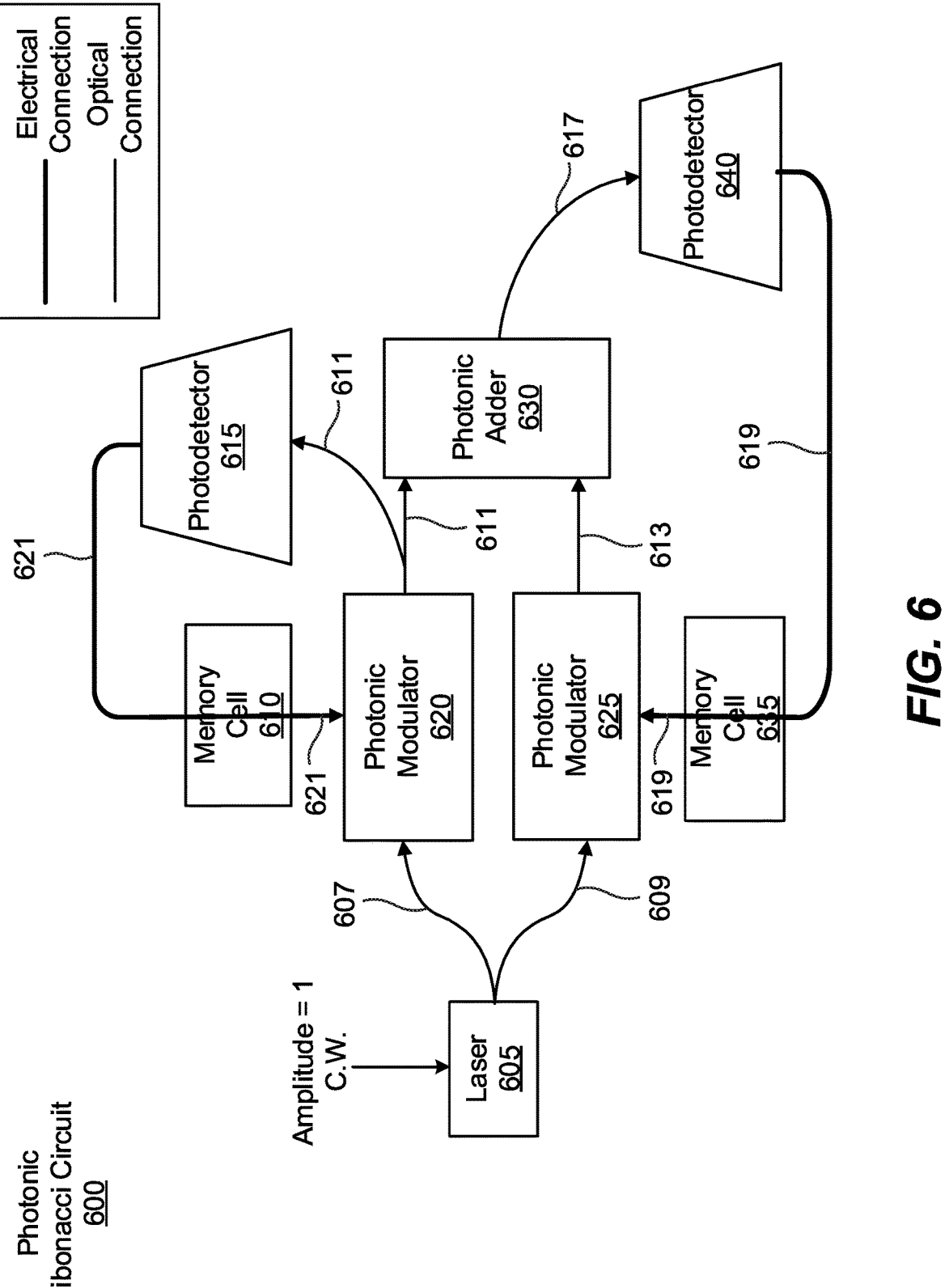
FIG. 6 illustrates an example block diagram of a photonic Fibonacci circuit, in accordance with some embodiments.

FIG. 6 illustrates an example block diagram of a photonic Fibonacci circuit 600, in accordance with some embodiments. The photonic Fibonacci circuit 600 represents a photonic sequential circuit that generates the Fibonacci sequence, i.e., the sequence of positive integers where every next number in the sequence is equal to a sum of two previous numbers in the sequence—1, 1, 2, 3, 5, 8, 13, etc.

The photonic Fibonacci circuit 600 may include a pair of electrical analog memory cells 610, 635, a pair of photonic intensity modulators 620, 625, a pair of photodetectors 615, 640, a photonic adder 630 (e.g., full adder), and a laser circuit 605. Each of the electrical analog memory cells 610, 635 may be an embodiment of the electrical analog memory cell 120, an embodiment of the electrical analog memory cell 205, an embodiment of an electrical analog memory cell of the electrical analog memory 310, or an embodiment of an electrical analog memory cell of the electrical analog memory 370. Each of the photonic intensity modulators 620, 625 may be an embodiment of the photonic intensity modulator 210, an embodiment of a photonic intensity modulator in the array of photonic intensity modulators 315, or an embodiment of a photonic intensity modulator in the array of photonic intensity modulators 355. Each of the photodetectors 615, 640 may be an embodiment of the photodetector 215, an embodiment of a photodetector in the array of photodetectors 320, or an embodiment of a photodetector in the array of photodetectors 375. The photonic adder 630 may be an embodiment (or part) of the photonic processor 130, an embodiment (or part) of the photonic processor 305, or an embodiment (or part) of the photonic processor 360.

The laser circuit 605 may be a CW light source that provides initial optical input signals 607 and 609 provided onto the photonic intensity modulators 620, 625. The initial optical input signals 607 and 609 may be, e.g., CW light signals with amplitudes of 1 (or logic high) that represent the first two numbers (e.g., two "1s") in the Fibonacci sequence. The photonic intensity modulators 620, 625 may pass initial optical input signals 607, 609 as optical signals 611 and 613 into the photonic adder 630. The photonic adder 630 may generate an optical signal 617 (i.e., the next number in the Fibonacci sequence) by summing the optical signals 611 and 613.

The optical signal 617 (i.e., the next number in the Fibonacci sequence) may be passed onto the photodetector 640, and the photodetector 640 may generate an analog electrical signal 619 corresponding to the optical signal 617. The analog electrical signal 619 may be stored in the electrical analog memory cell 635. At the same time, the optical signal 611 (or alternatively, the optical signal 613) may be passed onto the photodetector 615, and the photodetector 615 may generate an analog electrical signal 621 corresponding to the optical signal 611 (or alternatively, corresponding to the optical signal 613). In some embodiments, once the initial optical input signals 607, 609 are generated, the electrical analog memory cells 610 and 635 are reset.

The analog electrical signal 619 may be loaded from the electrical analog memory cell 635 into the photonic intensity modulator 625. Similarly, the analog electrical signal 621 may be loaded from the electrical analog memory cell 610 into the photonic intensity modulator 620. The photonic intensity modulator 625 may update the optical signal 613 based on the analog electrical signal 619 from the electrical analog memory cell 635. Similarly, the photonic intensity modulator 620 may update the optical signal 611 based on the analog electrical signal 621 from the electrical analog memory cell 610. The photonic adder 630 may then generate the updated optical signal 617 (i.e., the next number in the Fibonacci sequence) by summing the updated optical signals 611 and 613. This process of generating numbers of the Fibonacci sequence can continue until the electrical analog memory cells 610 and 635 are reset again.

Example Process Flow

FIG. 7 is a flowchart illustrating an example method 700 for operating an electrical analog memory coupled to a photonic processor as part of an integrated circuit, in accordance with some embodiments. The operations of method 700 may be performed at, e.g., the integrated circuit 100, the integrated circuit 300, or the integrated circuit 350. The integrated circuit may be deployed in a computing system that can further include a non-transitory computer-readable storage medium (e.g., optical, electrical, or electro-optical memory) for storing computer-executable instructions and data. The electrical analog memory may comprise at least one of a volatile electrical analog memory and a non-volatile electrical analog memory. The integrated circuit may be implemented as a silicon photonics platform.

The integrated circuit sends 705 a plurality of optical inputs from an array of photonic intensity modulators to the photonic processor via a first set of optical connections. The array of photonic intensity modulators may comprise at least one of: an array of electro-optic effect modulators, an array of carrier-depletion effect modulators, and an array of thermo-optic effect modulators. The integrated circuit generates 710, by the photonic processor, a plurality of optical outputs based on the plurality of optical inputs. The integrated circuit sends 715 the plurality of optical outputs from the photonic processor to an array of photodetectors via a second set of optical connections.

The integrated circuit generates 720 at least one first analog electrical signal by the array of photodetectors using the plurality of optical outputs. The integrated circuit sends 725 the at least one first analog electrical signal from the array of photodetectors to the electrical analog memory via at least one first electrical connection. The array of photodetectors may be coupled to at least one input of the electrical analog memory via a first set of electrical connections. The integrated circuit sends 730 at least one second analog electrical signal from the electrical analog memory to the array of photonic intensity modulators via at least one second electrical connection. At least one output of the electrical analog memory may be coupled to the array of photonic intensity modulators via a second set of electrical connections. The array of photodetectors may generate at least one analog electrical signal using at least one optical signal generated by the photonic processor, wherein the at least one analog electrical signal may be directly input into the electrical analog memory.

The electrical analog memory may comprise an array of electrical analog memory cells. A subset of the electrical analog memory cells may be coupled to a corresponding photonic intensity modulator in the array of photonic intensity modulators via at least one first electrical connection. A corresponding photodetector in the array of photodetectors may be coupled to the subset of electrical analog memory cells via at least one second electrical connection.

The integrated circuit may generate at least one optical input by the array of photonic intensity modulators using the at least one second analog electrical signal received from the electrical analog memory. The integrated circuit may send the at least one optical input from the array of photonic intensity modulators to the photonic processor via the first set of optical connections.

The photonic processor may execute a plurality of instructions at a latency determined based on at least one of a first speed of write-in to the electrical analog memory and a second speed of read-out from the electrical analog memory. The photonic processor may be configured to have a total computational time dependent upon at least one of a write-in time of the electrical analog memory and a read-out time of the electrical analog memory.

In some embodiments, the integrated circuit includes at least one analog-to-digital converter (ADC), an array of digital-to-analog converters (DACs) and/or a digital memory coupled between the at least one ADC and the array of DACs. The at least one ADC may be coupled to the array of photodetectors via a first set of electrical connections. The at least one ADC may receive a plurality of digital electrical signals from the array of photodetectors and generate at least one digital electrical output. The array of DACs may be coupled to the array of photonic intensity modulators via a second set of electrical connections. The array of DACs may receive a plurality of digital electrical inputs and generate a plurality of analog electrical inputs for the array of photonic intensity modulators. The integrated circuit may further include an optical memory directly coupled to the photonic processor via a third set of optical connections.

In some embodiments, at least one electrical analog memory cell of the electrical analog memory coupled to a photodetector in the array of photodetectors and a photonic intensity modulator in the array of photonic intensity modulator operates as a photonic flip-flop circuit. The photonic flip-flop circuit coupled to at least one photonic logic gate of the photonic processor may operate as a photonic sequential circuit. The photonic flip-flop circuit coupled to at least one photonic adder of the photonic processor may operate as a photonic counter circuit. A pair of electrical analog memory cells of the electrical analog memory, a pair of photodetectors in the array of photodetectors coupled to at least one photonic adder of the photonic processor, and a pair of photonic intensity modulators in the array of photonic intensity modulators may together operate as a photonic Fibonacci circuit.

The photonic processor coupled with the electrical analog memory presented in this disclosure performs operations with improved computational performance (i.e., with lower latency) as inherently analog photonic computing at the photonic processor is matched with a fast data access at the electrical analog memory, thus eliminating speed limitations introduced by ADCs and DACs. The photonic processor may execute operations at a latency determined based on a high speed of write-in to the electrical analog memory and a high speed of read-out from the electrical analog memory.

ADDITIONAL CONSIDERATIONS

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient, at times, to refer to these arrangements of operations as modules without loss of generality. The described operations and their associated modules can be embodied in software, firmware, hardware, or some combination thereof.

Any of the steps, operations or processes described herein can be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a non-transitory, tangible computer-readable storage medium, or any type of media suitable for storing electrical instructions, which is coupled to a computer system bus. Furthermore, any computing systems referred to in the specification can include a single processor or can be architectures employing multiple processor designs for increased computing capability.

Some embodiments of the present disclosure can further relate to a system comprising a processor, at least one computer processor, and a non-transitory computer-readable storage medium. The storage medium can store computer-executable instructions, which when executed by the compiler operating on the at least one computer processor, cause the at least one computer processor to be operable for performing the operations and techniques described herein.

Finally, the language used in the specification has been principally selected for readability and instructional purposes, and it has not been selected to delineate or circumscribe the inventive subject matter. It is therefore intended that the scope of the disclosure be limited not by this detailed description but rather by any claims that issue on an application based hereon. Accordingly, the disclosure of the embodiments is intended to be illustrative, but not limiting, of the scope of the disclosure, which is set forth in the following claims.

What is claimed is:

1. An integrated circuit, comprising:
a photonic processor;
an array of photonic intensity modulators coupled to the photonic processor via a first set of optical connections;
an array of photodetectors coupled to the photonic processor via a second set of optical connections; and
an electrical analog memory directly connected to the array of photodetectors via a first set of electrical connections and directly connected to the array of photonic intensity modulators via a second set of electrical connections,
wherein the electrical analog memory comprises a two-dimensional array of analog memory cells organized in a plurality of rows of analog memory cells and a plurality of columns of analog memory cells,
wherein each row of the plurality of rows of analog memory cells is directly connected to a respective photonic intensity modulator from the array of photonic intensity modulator via a respective electrical connection of the second set of electrical connections, and
wherein each photodetector from the array of photodetectors is directly connected to a respective row of the plurality of rows of analog memory cells via a respective electrical connection of the first set of electrical connections.

2. The integrated circuit of claim 1, wherein the electrical analog memory comprises at least one of a volatile electrical analog memory and non-volatile electrical analog memory.

3. The integrated circuit of claim 1, wherein the photonic processor is configured to execute a plurality of instructions at a latency determined based on at least one of a first speed of write-in to the electrical analog memory and a second speed of read-out from the electrical analog memory.

4. The integrated circuit of claim 1, wherein the photonic processor is configured to have a total computational time dependent upon at least one of a write-in time of the electrical analog memory and a read-out time of the electrical analog memory.

5. The integrated circuit of claim 1, wherein at least one electrical analog memory cell of the electrical analog memory coupled to a photodetector in the array of photodetectors and a photonic intensity modulator in the array of photonic intensity modulators operate as a photonic flip-flop circuit.

6. The integrated circuit of claim 5, wherein the photonic flip-flop circuit coupled to at least one photonic logic gate of the photonic processor operates as a photonic sequential circuit.

7. The integrated circuit of claim 5, wherein the photonic flip-flop circuit coupled to at least one photonic adder of the photonic processor operates as a photonic counter circuit.

8. The integrated circuit of claim 1, wherein a pair of electrical analog memory cells of the electrical analog memory, a pair of photodetectors in the array of photodetectors coupled to at least one photonic adder of the photonic processor, and a pair of photonic intensity modulators in the array of photonic intensity modulators operate as a photonic Fibonacci circuit.

9. The integrated circuit of claim 1, wherein the array of photodetectors is coupled to at least one input of the electrical analog memory via a first set of electrical connections, and at least one output of the electrical analog memory is coupled to the array of photonic intensity modulators via a second set of electrical connections.

10. The integrated circuit of claim 1, wherein the array of photonic intensity modulators is configured to generate at least one optical signal for the photonic processor using at least one analog electrical signal received from the electrical analog memory.

11. The integrated circuit of claim 1, wherein the array of photodetectors is configured to generate at least one analog electrical signal using at least one optical signal generated by the photonic processor, the at least one analog electrical signal directly input into the electrical analog memory.

12. The integrated circuit of claim 1, further comprising:

at least one analog-to-digital converter (ADC) coupled to the array of photodetectors via a first set of electrical connections, the at least one ADC configured to receive a plurality of digital electrical signals from the array of photodetectors and generate at least one digital electrical output;

an array of digital-to-analog converters (DACs) coupled to the array of photonic intensity modulators via a second set of electrical connections, the array of DACs configured to receive a plurality of digital electrical inputs and generate a plurality of analog electrical inputs for the array of photonic intensity modulators; and a digital memory coupled between the at least one ADC and the array of DACs.

13. The integrated circuit of claim 1, further comprising an optical memory directly coupled to the photonic processor via a third set of optical connections.

14. The integrated circuit of claim 1, wherein the array of photonic intensity modulators comprises at least one of: an array of electro-optic effect modulators, an array of carrier-depletion effect modulators, and an array of thermo-optic effect modulators.

15. The integrated circuit of claim 1, wherein the integrated circuit is implemented as a silicon photonics platform.

\* \* \* \* \*